US007203640B2

(12) United States Patent
Murase et al.

(10) Patent No.: US 7,203,640 B2
(45) Date of Patent: Apr. 10, 2007

(54) SYSTEM AND METHOD FOR DETERMINING AN INTENDED SIGNAL SECTION CANDIDATE AND A TYPE OF NOISE SECTION CANDIDATE

(75) Inventors: Kentaro Murase, Kawasaki (JP); Takuya Noda, Kawasaki (JP); Kazuhiro Watanabe, Kawasaki (JP)

(73) Assignee: Fujitsu Limited (JP)

( * ) Notice: Subject to any disclaimer, the term of this patent is extended or adjusted under 35 U.S.C. 154(b) by 905 days.

(21) Appl. No.: 10/283,238

(22) Filed: Oct. 30, 2002

(65) Prior Publication Data

US 2003/0120485 A1 Jun. 26, 2003

(30) Foreign Application Priority Data

Dec. 21, 2001 (JP) ............................ 2001-390189

(51) Int. Cl.
*G10L 11/06* (2006.01)
*G10L 15/20* (2006.01)

(52) U.S. Cl. ...................... 704/210; 704/215; 704/233

(58) Field of Classification Search ..................... None
See application file for complete search history.

(56) References Cited

U.S. PATENT DOCUMENTS 4,277,645 A * 7/1981 May, Jr. ..................... 704/233
5,579,432 A * 11/1996 Wigren ........................ 704/214
5,611,019 A * 3/1997 Nakatoh et al. ............ 704/233
5,828,997 A * 10/1998 Durlach et al. ............ 704/233
6,424,960 B1 * 7/2002 Lee et al. ..................... 706/20
6,889,187 B2 * 5/2005 Zhang ........................ 704/253
6,937,980 B2 * 8/2005 Krasny et al. .............. 704/231

FOREIGN PATENT DOCUMENTS

| | | | |
|---|---|---|---|
| JP | 6-67691 | A | 3/1994 |
| JP | 11-52977 | A | 2/1999 |
| JP | 11-102197 | A | 4/1999 |
| JP | 2000-163099 | A | 6/2000 |
| JP | 2000-322074 | A | 11/2000 |

OTHER PUBLICATIONS

Krolik et al., "Time Delay Estimation via Generalized Correlation with Adaptive Spatial Prefiltering", ICASSP-86, Tokyo, 1986, pp. 1893-1896.*

* cited by examiner

*Primary Examiner*—David Hudspeth
*Assistant Examiner*—Brian L. Albertalli
(74) *Attorney, Agent, or Firm*—Arent Fox, LLP

(57) ABSTRACT

An input signal is input via an input part. A plurality of signal section candidate detecting parts having different detection algorithms detect an intended signal section candidate and a noise signal section candidate from the input signal. A signal section classifying part is notified of detection results from the respective signal section candidate detecting parts, and classifies the respective signal section candidates based on a combination of the detection results. The signal section classifying part classifies a signal section candidate, which is detected as an intended signal section candidate by all the signal section candidate detecting parts, as an intended signal section, classifies a signal section candidate, which is detected as a noise signal section candidate by all the signal section candidate detecting parts, as a stationary noise signal section, and classifies a signal section candidate, which is detected as an intended signal section candidate by any of the signal section candidate detecting parts and detected as a noise signal section candidate by either of the signal section candidate detecting parts, as a non-stationary noise signal section.

16 Claims, 14 Drawing Sheets

SYSTEM AND METHOD FOR DETERMINING AN INTENDED SIGNAL SECTION CANDIDATE AND A TYPE OF NOISE SECTION CANDIDATE

BACKGROUND OF THE INVENTION

1. Field of the Invention

The present invention relates to a signal processing system and method for detecting an intended signal section and a noise signal section to be detected from a wave signal propagating through a medium such as light, a sound, an ultrasonic wave, and an electromagnetic wave. The term “medium” through which a wave signal propagates includes all the media, spaces, and locations through which a wave may propagate.

2. Description of the Related Art

An input signal obtained by receiving a wave signal from an intended wave source is likely to contain a noise signal other than an intended signal. When the level of a noise is high, the processing precision of the intended signal is degraded. Particularly in an application using speech recognition, when the level of a noise is high, a voice signal that is an intended signal cannot be recognized correctly. Therefore, conventionally, it is important in voice signal processing to detect an intended signal section and a noise signal section other than the intended signal section and separate them from each other.

In the prior art, in order to separate an intended signal section from a noise signal section, separation processing based on a change in a power of an input voice signal has been widely used. The basic principle thereof is as follows. The power of an input voice signal is checked, and when the power exceeds a threshold value, an intended signal section is identified to be separated.

Another processing of separating an intended signal section from a noise signal section is conducted as follows. The direction of arrival of an input signal is detected. When the direction in which a wave source transmitting an intended signal is assumed to be present is matched with the arrival direction of the input signal, the input signal is considered as an intended signal section to be separated. Input signals from the directions other than the direction in which a wave source is assumed to be present are considered as noise signals. In the prior art, as a method for detecting the arrival direction of an input signal, delay time detection processing using a correlation function and the like are known.

In a telephone and a speech recognition apparatus, in order to enhance ease of listening and a speech recognition ratio, noise suppression processing is added often in addition to the above-mentioned processing of detecting an intended signal section and a noise signal section. As conventional noise suppression processing, spectrum subtraction processing is widely known. The spectrum subtraction processing is conducted as follows. An input signal is converted into a spectrum in a frequency region by Fourier transformation, and thereafter, a noise spectrum model is presumed in a noise signal section. The presumed noise spectrum is subtracted from the spectrum of the input signal in an intended signal section to remove a noise signal, and the resultant signal is returned to a time region by inverse Fourier transformation.

However, the above-mentioned conventional processing of detecting an intended signal section and a noise signal section has the following problems.

First, in the processing of detecting an intended signal section and a noise signal section based on a change in a power of an input voice signal, if the level of a noise signal is close to that of an intended signal, it is difficult to detect the intended signal and the noise signal correctly.

FIG. 13 illustrates a system for suppressing a noise by the conventional processing of detecting a signal section based on a power of an input signal and the conventional processing of suppressing a noise based on spectrum subtraction. In particular, the case where a signal to be dealt with is a voice signal will be described.

Reference numeral 510 denotes a microphone. Reference numeral 520 denotes a power-based signal section detecting part for conducting conventional detection processing by comparing the power of an input signal with a predetermined threshold value to separate an intended signal section from a noise signal section. Reference numeral 530 denotes a spectrum subtracting part for suppressing a noise signal by conventional spectrum subtraction.

It is assumed that a sound to be input to the microphone 510 contains a voice signal 501 of a speaker and a noise signal 502. It is also assumed that the noise signal 502 contains a non-stationary noise signal as well as a stationary noise signal. An input signal 503 to the microphone 510 contains the voice signal 501 superimposed with the noise signal 502, and is composed of signal sections (1), (4) and (6) (containing a stationary noise), signal sections (2) and (5) (containing a non-stationary noise and a stationary noise), and a signal section (3) (containing a voice and a stationary noise).

The power-based signal section detecting part 520 receives the above-mentioned input signal to conduct the processing of detecting a signal section based on a power of an input signal, thereby obtaining a signal section detection result 504. The power-based signal section detecting part 520 determines the signal sections (1), (4) and (6) having a power below a threshold value as noise signal sections, and determines the signal sections (2), (3) and (5) having a power exceeding a threshold value as voice sections.

However, it is understood that the signal sections (2) and (5) are non-stationary noise signal sections, and hence, signal sections are not detected correctly.

As described above, according to the conventional processing of detecting a signal section based on a power of an input signal, a non-stationary noise signal section at a similar level to that of a voice signal may be erroneously determined to be a voice signal section, and a signal section may not be detected correctly. Furthermore, when a noise source is a voice of another person, even if a feature value other than a power such as a correlation function is used, the voice of another person that is a noise may be erroneously determined to be an intended voice.

Furthermore, according to the noise suppression result 505 obtained by the spectrum subtracting part 530, in the stationary noise signal sections (1), (4) and (6) and the voice signal section (3), a noise signal component is suppressed correctly and effectively due to the removal of a stationary noise. However, in the non-stationary noise signal sections (2) and (5), since they are erroneously determined to be voice signal sections in the signal section detection result 504, only a stationary noise signal component has been removed, and most of non-stationary noise signal components remain.

Thus, according to the conventional processing of detecting a signal section based on a power of an input signal, a non-stationary noise signal section may be erroneously detected as a voice signal section. Therefore, the processing of detecting a signal section cannot be conducted correctly.

Furthermore, regarding the suppression of a noise signal, a non-stationary noise signal component cannot be suppressed.

Second, in the conventional processing of separating an intended signal section from a noise signal section based on an arrival direction of an input signal, if a noise source is present in the same direction as that of a wave source transmitting an intended sound, it is difficult to separate an intended signal from a noise signal correctly. That is, there is a possibility that a signal section detected as an intended signal section may contain a noise signal section.

Furthermore, regarding a signal section detected as a noise signal section, it is impossible to determine if the signal section is a stationary noise signal section or a non-stationary noise signal section.

FIG. 14 illustrates a system for suppressing a noise by the conventional processing of detecting a signal section based on an arrival direction of an input signal and the conventional processing of suppressing a noise based on spectrum subtraction.

A microphone 510 and a spectrum subtracting part 530 are the same as those in FIG. 13.

Reference numeral 540 denotes an arrival direction detecting part for detecting an arrival direction of an input signal and separating an intended signal section from a noise signal section based on the arrival direction. It is assumed that the processing of detecting an arrival direction is conducted by detecting a delay time using a correlation function.

It is assumed that a sound input to the microphone 510 contains a voice signal 501 and a noise signal 502 in the same way as in FIG. 13. It is also assumed that the noise signal 502 contains a stationary noise mixed with a non-stationary noise. A speaker and a noise source are present in different directions seen from a sensor. An input signal 503 to the microphone 510 contains the voice signal 501 superimposed with the noise signal 502, and is composed of signal sections (1), (4) and (6) (containing a stationary noise), signal sections (2) and (5) (containing a non-stationary noise and a stationary noise), and a signal section (3) (containing a voice and a stationary noise).

The arrival direction detecting part 540 receives the above-mentioned input signal 503 to conduct the processing of detecting a signal section based on an arrival direction of the input signal, and obtains a signal section detection result 506. The arrival direction detecting part 540 determines only the section (3), in which the previously set arrival direction (direction of a speaker) of an intended sound is matched with the arrival direction of an input signal, as a voice section, and determines the other sections (1), (2), (4), (5) and (6) as noise signal sections.

However, only with the arrival direction detecting part 540, it cannot be determined if the noise signal sections (1), (2), (4), (5) and (6) are the stationary noise signal sections or the non-stationary noise signal sections.

According to the noise suppression by the spectrum subtracting part 530, only a stationary noise is presumed by spectrum subtraction and suppressed. In the case of processing of detecting a signal section based on an arrival direction of an input signal, it cannot be determined if a detected noise signal section is a stationary noise signal section or a non-stationary noise signal section. Therefore, a noise model is presumed based on the respective noise signal sections (1), (2), (4), (5) and (6). Because of this, even in the non-stationary noise signal section (2) immediately before the voice signal section (3), a noise model is presumed. As a result, a noise spectrum presumed based on a noise model superimposed with a noise component that is not actually present in the voice signal section (3) is subtracted from an input spectrum, which distorts a signal in the voice signal section (3).

SUMMARY OF THE INVENTION

Therefore, with the foregoing in mind, it is an object of the present invention to classify an input signal into an intended signal section and a noise signal section and classify a noise signal section into a plurality of sections having different properties, and apply noise suppression processing in accordance with the properties of the respective detected signal sections. In particular, the object of the present invention is to separate a stationary noise from an non-stationary noise correctly in an input environment where these noises are mixed, and conduct appropriate noise suppression processing with respect to the stationary noise and appropriate noise suppression processing with respect to the non-stationary noise.

In order to achieve the above-mentioned object, a signal processing system of the present invention includes: an input part for inputting an input signal; a plurality of signal section candidate detecting parts for detecting an intended signal section candidate that is a candidate in a signal section in which an intended signal to be detected is recorded and a noise signal section candidate other than the intended signal section candidate from the input signal, the respective signal section candidate detecting parts using different detection algorithms for an intended signal section candidate and a noise signal section candidate; and a signal section classifying part for being notified of detection results of the respective signal section candidates from the plurality of signal section candidate detecting parts and classifying the signal section candidates based on a combination of the detection results.

Herein, it is preferable that the signal section classifying part classifies a signal section candidate, which is detected as an intended signal section candidate by all the plurality of signal section candidate detecting parts, as an intended signal section, classifies a signal section candidate, which is detected as a noise signal section candidate by all the plurality of signal section candidate detecting parts, as a type-I noise signal section, and classifies a signal section candidate, which is detected as an intended signal section candidate by any of the plurality of signal section candidate detecting parts and detected as a noise signal section candidate by any of the plurality of signal section candidate detecting parts, as a type-II noise signal section.

Because of the above configuration, an input signal can be classified into an intended signal section and a noise signal section, and furthermore, the noise signal section can be classified into a plurality of different noise signal sections.

Furthermore, if the signal section classifying part classifies the type-I noise signal section as a stationary noise signal section in which only a stationary noise appears, and the type-II noise signal section as a non-stationary noise signal section in which a stationary noise superimposed with a non-stationary noise appears, the noise signal section can be appropriately classified into a stationary noise signal section and a non-stationary noise signal section.

Herein, if at least one of the plurality of signal section candidate detecting parts uses an algorithm for detecting the intended signal section candidate and the noise signal section candidate based on a change in a power of the input signal, and at least one of the plurality of signal section candidate detecting parts uses an algorithm for detecting an arrival direction of the input signal and detecting the intended signal section candidate and the noise signal section candidate based on the arrival direction, the noise signal section candidate can be appropriately classified into noise signal section candidates having a plurality of different properties.

In order to detect a signal section candidate based on a change in a power and detect a signal section candidate based on an arrival direction, in the signal processing system of the present invention, a plurality of input signals obtained from at least two observation points are input to the input part, and there are provided a delay time detecting part for obtaining a delay time based on a correlation function of two input signals arbitrarily selected from the plurality of input signals and a direction detecting part for detecting the arrival direction of the input signal with respect to input points of the two arbitrarily selected input signals, based on the delay time detected by the delay time detecting part.

Herein, the above-mentioned processing of detecting a signal section candidate based on an arrival direction is conducted simply, and in the signal processing system of the present invention, a plurality of input signals obtained from at least two observation points are input to the input part, and there are provided a subtraction operating part for calculating a subtraction between two input signals arbitrarily selected from the plurality of input signals, a derivative signal operating part for calculating a derivative signal of either input signal of the two arbitrarily selected input signals, a division signal operating part for calculating a division signal obtained by dividing the subtraction by the derivative signal, a delay time detecting part for detecting the division signal as a delay time between the two arbitrarily selected input signals, and a direction detecting part for detecting the arrival direction of the input signal with respect to the observation points of the two arbitrarily selected input signals based on the delay time detected by the delay time detecting part.

Because of the above configuration, instead of conducting processing based on an algorithm with a large amount of operation such as a correlation function, a delay time and an arrival direction can be obtained approximately only by one subtraction operation, derivative operation, and division operation.

The signal processing system of the present invention includes a noise suppressing part for applying the same noise suppression processing to all the intended signal section candidate and the noise signal section candidate or selecting noise suppression processing in accordance with a classification result of the signal section classifying part and applying the selected noise suppression processing to the intended signal section candidate and the noise signal section candidate. The signal processing system of the present invention may include a noise suppressing part that does not conduct noise suppression processing with respect to a signal in the intended signal section and conducts noise suppression processing of assigning a weight smaller than 1 with respect to a signal in the stationary noise signal section and a signal in the non-stationary noise signal section. Furthermore, the signal processing system of the present invention may include a noise model presuming part for presuming a stationary noise model only in a signal section classified as the stationary noise signal section and stops presuming a noise model in signal sections classified as the intended signal section and the non-stationary noise signal section, wherein the noise suppressing part suppresses a noise based on the noise model presumed by the noise model presuming part.

Because of the above configuration, noise suppression processing appropriate for a stationary noise and noise suppression processing appropriate for a non-stationary noise can be conducted.

If a speech recognizing part for recognizing a voice with respect to a voice signal in an intended signal section is provided, speech recognition processing with a high precision can be conducted.

Furthermore, if the above processing is provided as a program, the wave signal processing of the present invention can be executed on a computer.

These and other advantages of the present invention will become apparent to those skilled in the art upon reading and understanding the following detailed description with reference to the accompanying figures.

DESCRIPTION OF THE PREFERRED EMBODIMENTS

Hereinafter, the signal processing system and signal processing method of the present invention will be described by way of illustrative embodiments with reference to the drawings.

Embodiment 1

A signal processing system of Embodiment 1 according to the present invention will be described.

The signal processing system of Embodiment 1 includes a plurality of signal section candidate detecting parts for detecting an intended signal section candidate that is a candidate for a signal section in which an intended signal to be detected from an input signal is recorded and a noise signal section candidate, and a signal section classifying part for being notified of detection results of the signal section candidates from a plurality of signal section candidate detecting parts and classifying the signal section candidates based on a combination of the detection results.

The signal processing system of the present invention uses a plurality of signal section candidate detecting parts for not only detecting an intended signal section candidate and a noise signal section candidate from an input signal, but also detecting an intended signal section candidate and a noise signal section candidate to be detected from an input signal by different algorithms so as to obtain information for classifying the detected noise signal section candidate into noise signal section candidates having a plurality of different properties.

Figure 1:
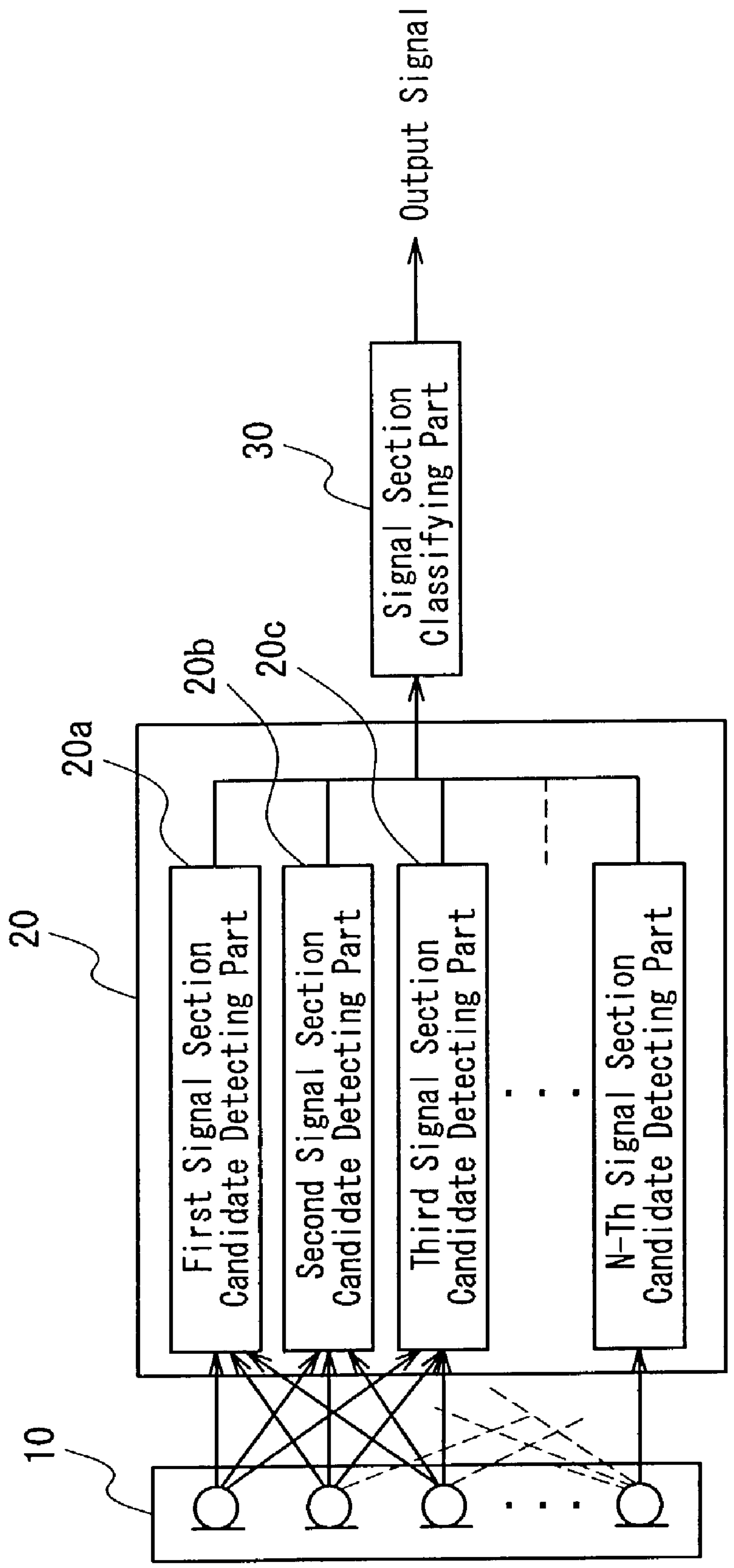
FIG. 1 shows a configuration of a signal processing system of Embodiment 1 according to the present invention.

FIG. 1 shows a configuration of a signal processing system of Embodiment 1.

In FIG. 1, reference numeral 10 denotes an input part, 20 denotes a signal section candidate detecting part, and 30 denotes a signal section classifying part.

The input part 10 is used for inputting a signal. Examples of the input part 10 include various kinds of input devices for receiving a wave signal to be input, such as a microphone and an optical sensor. The input part 10 may be a data input device for inputting a signal collected outside and recorded.

The signal section candidate detecting part 20 conducts a plurality of signal section candidate detecting processes for detecting an intended signal section candidate to be detected and a noise signal section candidate other than the intended signal section candidate from a signal input via the input part 10. FIG. 1 shows a first signal section candidate detecting part to an N-th signal section candidate detecting part. Herein, N is an integer of 2 or more. In the following description of the processing of detecting a signal section candidate, for convenience, three signal section candidate detecting parts 20*a* to 20*c* will be described.

The signal section candidate detecting parts 20*a* to 20*c* detect intended signal section candidates to be detected from signals and noise signal section candidates other than the intended signal section candidates by different algorithms.

Thus, the signal processing system of the present invention detects signal section candidates by different algorithms, thereby obtaining information for classifying a noise signal section candidate into noise signal section candidates having a plurality of different properties.

The signal section classifying part 30 is notified of detection results of signal section candidates from a plurality of signal section candidate detecting parts 20, and classifies each signal section candidate based on a combination of the detection results.

In Embodiment 1, the classification processing by the signal section classifying part 30 is conducted based on the following first to third paradigms.

The first paradigm is that signal section candidates detected as intended signal section candidates in all the plurality of signal section candidate detecting parts 20 are classified as intended signal sections.

The second paradigm is that signal section candidates detected as noise signal section candidates in all the plurality of signal section candidate detecting parts 20 are classified as type-I noise signal sections.

The third paradigm is that signal section candidates detected as intended signal section candidates in any of the plurality of signal section candidate detecting parts 20 and detected as noise signal section candidates in any thereof are classified as type-II noise signal sections.

According to the first paradigm, signal section candidates detected as intended signal section candidates in all the plurality of signal section candidate detecting parts 20 are classified as intended signal sections. The signal section candidates classified based on the first paradigm are signal section candidates detected as intended signal section candidates by all the algorithms of all the signal section candidate detecting parts 20 (in this example, 20*a* to 20*c*), which are signal section candidates satisfying all the conditions for assuming them to be intended signal sections.

According to the second paradigm, signal section candidates detected as noise signal section candidates in all the plurality of signal section candidate detecting parts 20 are classified as type-I noise signal sections. The signal section candidates classified based on the second paradigm are signal section candidates detected as noise signal section candidates by all the algorithms of all the signal section candidate detecting parts 20 (in this example, 20*a* to 20*c*), which are signal section candidates satisfying all the conditions for assuming them to be noise signal sections.

According to the third paradigm, signal section candidates detected as intended signal section candidates in any of a plurality of signal section candidate detecting parts 20 and noise signal section candidates in any thereof are classified as type-II noise signal sections. The signal section candidates classified based on the third paradigm are signal section candidates whose detection results are different in the signal section candidate detecting parts 20 (in this example, 20*a* to 2*c*). As being detected as noise signal section candidates by any of the algorithms, the signal section candidates are dealt with as noise signal section candidates, whereas they are detected as intended signal section candidates by other algorithms. Thus, the signal sections have aspects satisfying the conditions for assuming them to be intended signal section candidates; however, they do not satisfy the conditions as noise signal sections in all the algorithms as in the type-I noise signal section candidates. Therefore, the signal sections are classified as type-II noise signal sections.

Next, a processing flow of the signal processing system of the present invention will be described while tracking a signal processing result in each part of the signal processing system shown in FIG. 1.

Figure 2:
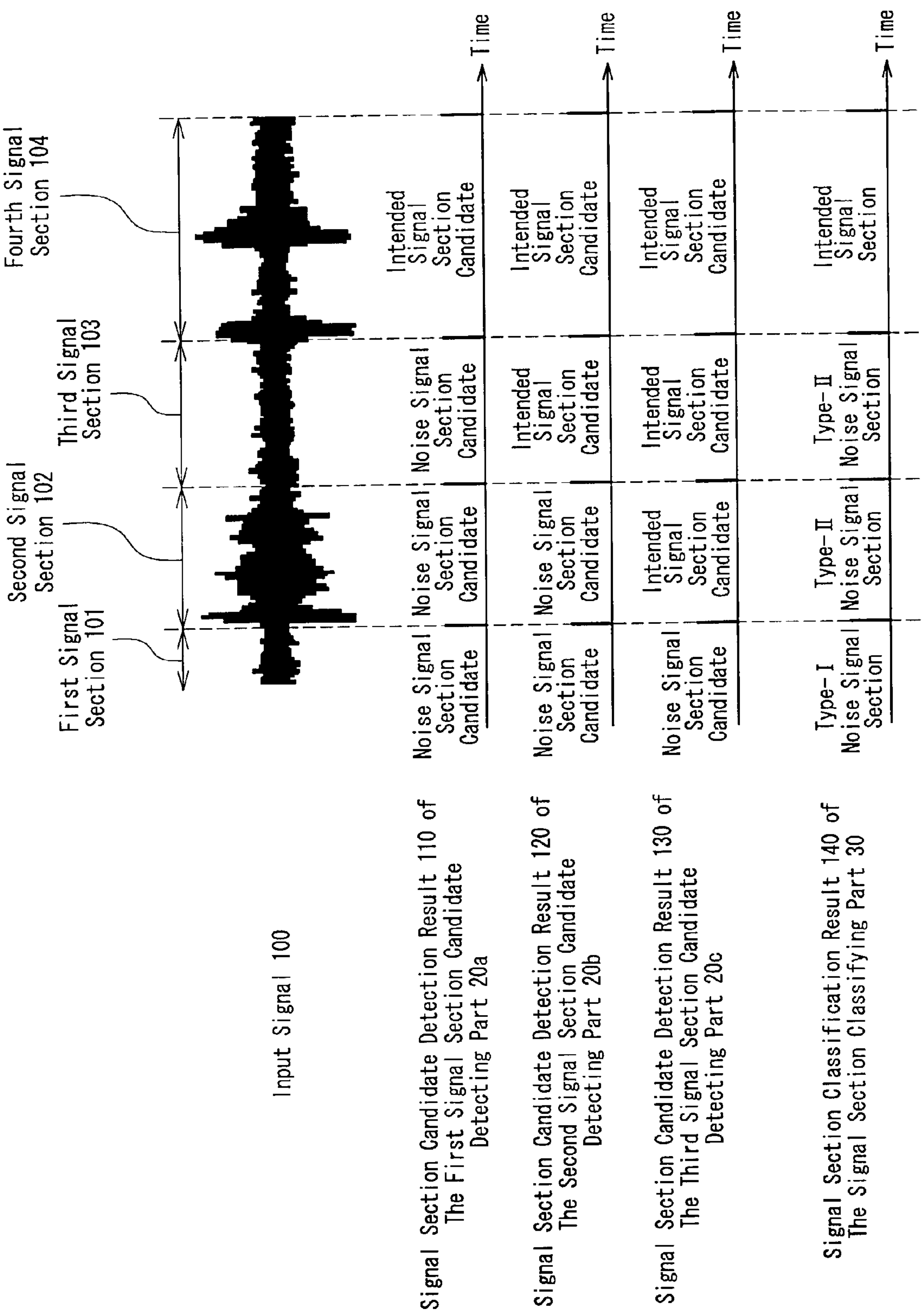
FIG. 2 shows an input signal and a signal in each part of a signal processing system of Embodiment 1 according to the present invention.

FIG. 2 shows an input signal and a signal in each part of the signal processing system. In this example, the signal section candidate detecting part 20 includes three signal section candidate detecting parts (first signal section candidate detecting part 20*a* to third signal section candidate detecting part 20*c*).

In FIG. 2, reference numeral 100 denotes an input signal input from the input part 10, 110 denotes a graph showing detection results of signal section candidates by the first signal section candidate detecting part 20*a*, 120 denotes a graph showing detection results of signal section candidates by the second signal section candidate detecting part 20*b*, 130 denotes a graph showing detection results of signal section candidates by the third signal section candidate detecting part 20*c*, and 140 denotes a graph showing a classification result of a signal section candidate by the signal section classifying part 30.

In the graphs 110, 120, and 130, a horizontal axis represents a time.

The input signal 100 contains a first signal section 101, a second signal section 102, a third signal section 103, and a fourth signal section 104 arranged in a time sequence.

In this example, each signal section of the input signal 100 is detected by the first signal section candidate detecting part 20*a* as follows: the first signal section 101 is detected as a noise signal section candidate; the second signal section 102 is detected as a noise signal section candidate; the third signal section 103 is detected as a noise signal section candidate; and the fourth signal section 104 is detected as an intended signal section candidate.

Furthermore, each signal section of the input signal 100 is detected by the second signal section candidate detecting part 20*b* as follows: the first signal section 101 is detected as a noise signal section candidate; the second signal section 102 is detected as a noise signal section candidate; the third signal section 103 is detected as an intended signal section candidate; and the fourth signal section 104 is detected as an intended signal section candidate.

Furthermore, each signal section of the input signal 100 is detected by the third signal section candidate detecting part 20*c* as follows: the first signal section 101 is detected as a noise signal section candidate; the second signal section 102 is detected as an intended signal section candidate; the third signal section 103 is detected as an intended signal section candidate; and the fourth signal section 104 is detected as an intended signal section candidate.

The signal section classifying part 30 is notified of detection results of signal section candidates from the first signal section candidate detecting part 20*a* to the third signal section candidate detecting part 20*c*, and classifies each signal section candidate based on the above first to third paradigms.

The first signal section 101 is classified as a type-I noise signal section based on the second paradigm.

The second signal section 102 is classified as a type-II noise signal section based on the third paradigm.

The third signal section 103 is similarly classified as a type-II noise signal section based on the third paradigm.

The fourth signal section 104 is classified as an intended signal section based on the first paradigm.

Herein, although the second signal section 102 and the third signal section 103 are both classified as type-II noise signal sections, they can be classified more for the following reason. The second signal section 102 is detected as a noise signal section candidate by an algorithm used by the second signal section candidate detecting part 20*b*, whereas the third signal section 103 is detected as an intended signal section candidate by an algorithm used by the second signal section candidate detecting part 20*b*. Thus, the nature thereof is different from each other.

The signal section classifying part 30 classifies the noise signal sections more, whereby the second signal section 102 can be classified as a first type-II noise signal section, and the third signal section 103 can be classified as a second type-II noise signal section.

As described above, the signal processing system of Embodiment 1 can not only classify an input signal into an intended signal section and a noise signal section, but also classify a noise signal section into noise signal sections having a plurality of different properties. Furthermore, the noise signal sections thus classified can be subjected to noise suppression processing of Embodiments 5 to 7 (described later), and a classified intended signal section can be subjected to speech recognition processing of Embodiment 8 (described later).

Embodiment 2

In Embodiment 2, a signal processing system for classifying a noise signal section candidate detected from an input signal into a stationary noise signal section and a non-stationary noise signal section.

Herein, a stationary noise signal refers to a stable noise signal in which an amplitude of an input signal and a frequency spectrum fluctuate less with time. An example of the stationary noise signal includes a machine sound emitted from a fan operating at a constant r.p.m. (revolutions per minute) in an input environment of an input signal.

A non-stationary noise signal refers to a noise signal in which an amplitude of an input signal and a frequency spectrum fluctuate substantially with time and which is output from a noise source present in a non-stationary manner and a noise source emitting a noise in a non-stationary manner. Examples of the non-stationary noise signal include a noise signal emitted from a vehicle passing through an input environment of an input signal and a noise signal of a bell sound emitted by a clock present in an input environment of an input signal as a time signal.

The configuration of the signal processing system of Embodiment 2 is the same as that in FIG. 1, so that it is not shown in a figure.

In the same way as in Embodiment 1, the signal section classifying part 30 is notified of detection results of signal section candidates from a plurality of signal section candidate detecting parts 20, and classifies each signal section candidate based on a combination of the detection results. In the same way as in Embodiment 1, classification of each signal section candidate is conducted based on the first to third paradigms described in Embodiment 1. However, in the signal processing system of Embodiment 2, a type-I noise signal section classified based on the second paradigm is classified as a stationary noise signal section in which only a stationary noise appears, and a type-II noise signal section classified based on the third paradigm is classified as a non-stationary noise signal section in which a stationary noise is superimposed with a non-stationary noise.

A stationary noise is a stable noise signal in which acoustic properties do not fluctuate with time, so that the stationary noise can be assumed to be detected as a noise signal section candidate by any algorithm if the algorithm used by the signal section candidate detecting part 20 is appropriate. On the other hand, a non-stationary noise is a noise signal in which acoustic properties fluctuate with time. The non-stationary noise is detected as a noise signal section candidate by any algorithm, while it can be assumed to be detected as an intended signal section candidate by any other algorithm.

Next, a processing flow will be described while tracking a signal processing result in each part of the signal processing system of Embodiment 2.

Figure 3:
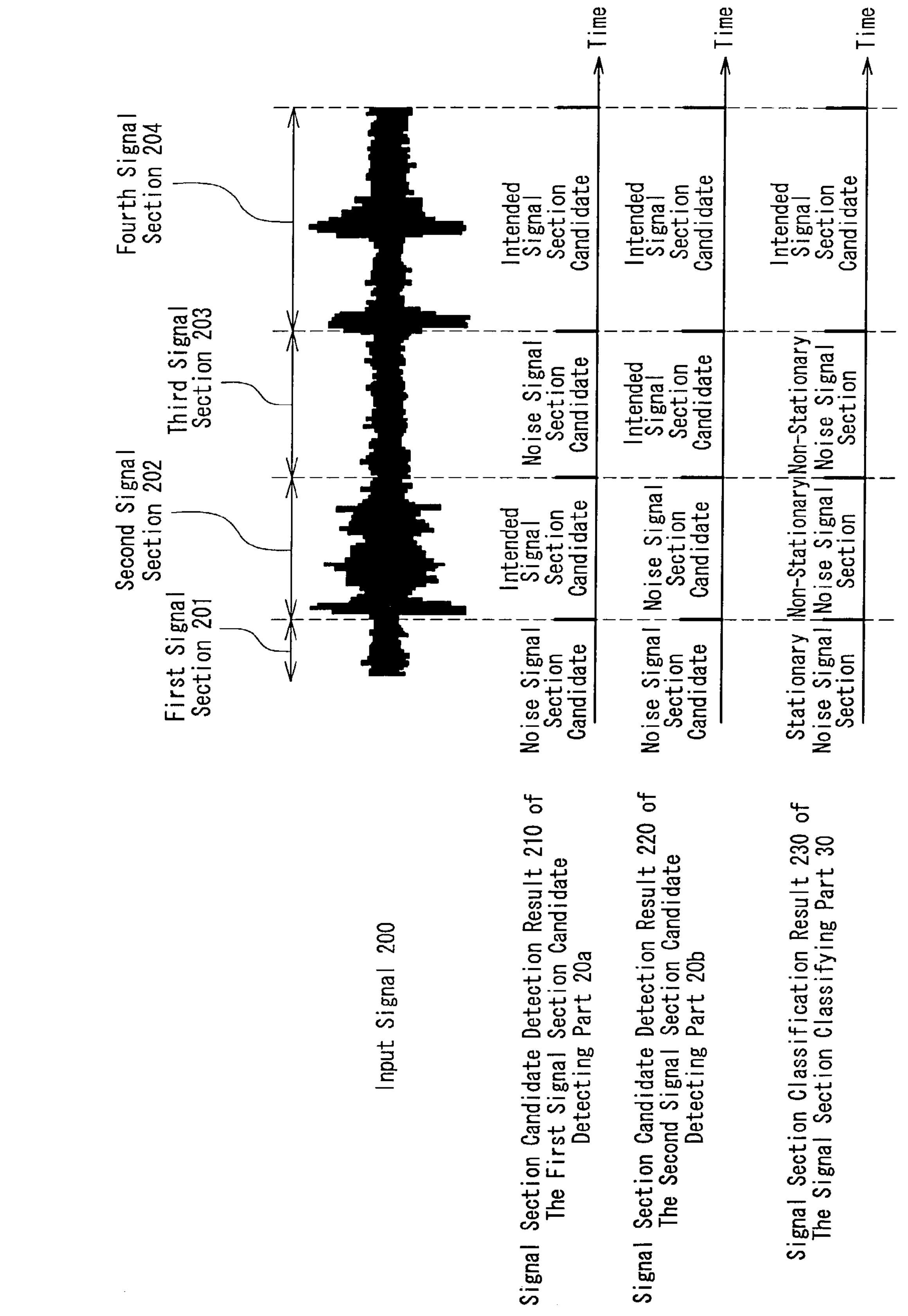
FIG. 3 shows an input signal and a signal in each part of a signal processing system of Embodiment 2 according to the present invention.

FIG. 3 shows an input signal and a signal in each part of the signal processing system in Embodiment 2. In this example, the signal section candidate detecting part 20 includes two signal section candidate detecting parts (first signal section candidate detecting part 20*a* and second signal section candidate detecting part 20*b*).

In FIG. 3, reference numeral 200 denotes an input signal input from the input part 10, 210 denotes a graph showing detection results of signal section candidates by the first signal section candidate detecting part 20*a*, 220 denotes a graph showing detection results of signal section candidates by the second signal section candidate detecting part 20*b*, and 230 denotes a graph showing detection results of signal section candidates by the signal section classifying part 30.

In this example, the input signal 200 contains a first signal section 201, a second signal section 202, a third signal section 203, and a fourth signal section 204 arranged in a time sequence.

In this example, each signal section of the input signal 200 is detected by the first signal section candidate detecting part 20*a* as follows: the first signal section 201 is detected as a noise signal section candidate; the second signal section 202 is detected as an intended signal section candidate; the third signal section 203 is detected as a noise signal section candidate; and the fourth signal section 204 is detected as an intended signal section candidate.

Furthermore, each signal section of the input signal 200 is detected by the second signal section candidate detecting part 20*b* as follows: the first signal section 201 is detected as a noise signal section candidate; the second signal section 202 is detected as a noise signal section candidate; the third signal section 203 is detected as an intended signal section candidate; and the fourth signal section 204 is detected as an intended signal section candidate.

The signal section classifying part 30 is notified of detection results of signal section candidates from the first signal section candidate detecting part 20*a* and the second signal section candidate detecting part 20*b*, and classifies each signal section candidate based on the above first to third paradigms.

The first signal section 201 is classified as a type-I noise signal section based on the second paradigm.

The second signal section 202 is classified as a type-II noise signal section based on the third paradigm.

The third signal section 203 is similarly classified as a type-II noise signal section based on the third paradigm.

The fourth signal section 204 is classified as an intended signal section based on the first paradigm.

In Embodiment 2, the signal section classifying part 30 further classifies the first signal section 201 as a stationary noise signal section, the second signal section 202 as a non-stationary noise signal section, the third signal section 203 as a non-stationary noise signal section, and the fourth signal section 204 as an intended signal section.

As described above, in the signal processing system of Embodiment 2, a noise signal section candidate detected from an input signal can be classified into a stationary noise signal section and a non-stationary noise signal section. Furthermore, the noise signal sections thus classified can be subjected to noise suppression processing of Embodiments 5 to 7 (described later), and a classified intended signal section can be subjected to speech recognition processing of Embodiment 8 (described later).

Embodiment 3

In a signal processing system of Embodiment 3, a signal section candidate detecting part uses, as an algorithm, a combination of an algorithm for detecting an intended signal section candidate and a noise signal section candidate based on a change in a power of an input signal and an algorithm for detecting an intended signal section candidate and a noise signal section candidate based on an arrival direction of the input signal.

Figure 4:
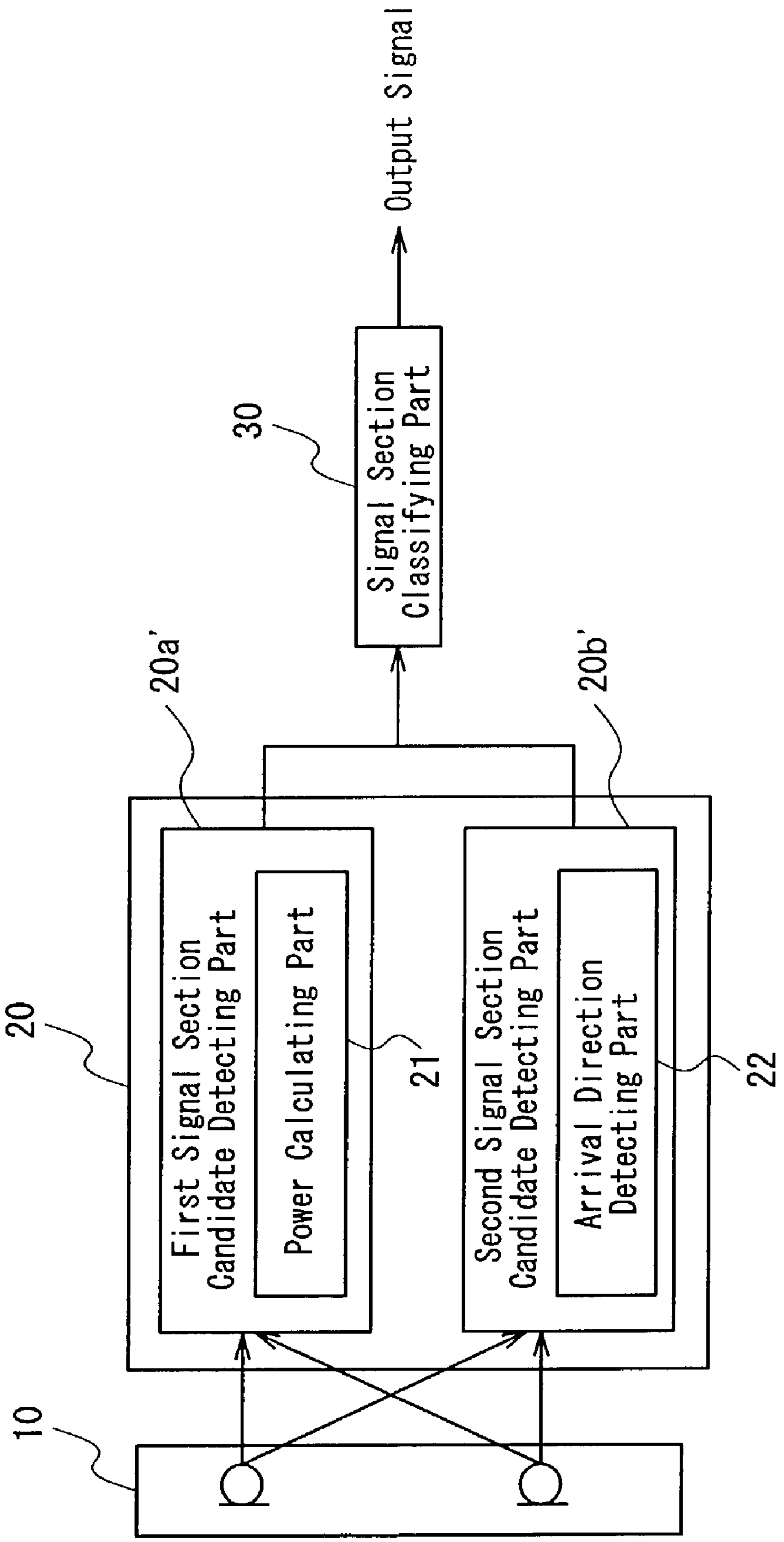
FIG. 4 shows a configuration of a signal processing system of Embodiment 3 according to the present invention.

FIG. 4 shows a configuration of the signal processing system of Embodiment 3. In FIG. 4, the input part 10 and the signal section classifying part 30 are the same as those in FIG. 1.

A first signal section candidate detecting part 20*a*' includes a power calculating part 21, and uses an algorithm for detecting an intended signal section candidate and a noise signal section candidate based on a change in a power of an input signal.

An intended signal is targeted for an input, and its level is set so as to be large in an input environment. Therefore, the power of the intended signal is assumed to be large. According to the algorithm based on a change in a power, a signal section candidate with a change in a power equal to or more than a predetermined value is detected as an intended signal section candidate, and a signal section candidate with a change in a power less than the predetermined value is detected as a noise signal section candidate.

The power calculating part 21 calculates a power of an input signal. An example of power calculation processing is shown below. A power P(t) in a time section T where an input sound is f(t) is calculated by the following Formula 1.

$$P(t) = \sum_{i=0}^{T} f^2(t-i) \tag{1}$$

The first signal section candidate detecting part 20*a*' monitors a derivative P'(t) representing the change in a power with time obtained in the power calculating part 21, and determines an intended signal section candidate when the change in a power is equal to or more than a threshold value Ath and determines a noise signal section candidate when the change in a power is less than the threshold value Ath. The threshold value Ath may be previously given or may be determined by taking a moving average of an input sound P'(t).

The second signal section candidate detecting part 20*b*' includes an arrival direction detecting part 22, and uses an algorithm for detecting an intended signal section candidate and a noise signal section candidate based on an arrival direction of an input signal. It is assumed that a plurality of signals obtained from at least two observation points are input via the input part 10.

The intended signal is targeted for an input, and its arrival direction is set to be a predetermined direction (e.g., a front direction) in an input environment. Therefore, the arrival direction of the intended signal is assumed. According to the algorithm based on an arrival direction, a signal section candidate in which an arrival direction of an input signal is in a predetermined direction is detected as an intended signal section candidate, and a signal section candidate in which an arrival direction of an input signal is not in a predetermined direction is detected as a noise signal section candidate.

As examples of a detailed configuration of the arrival direction detecting part 22, the following two configurations will be described.

Figure 5A:
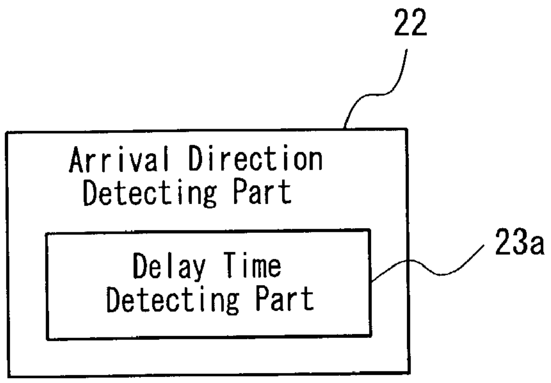
FIGS. 5A and 5B show the details of the configuration mainly based on a delay time calculating part.

The first exemplary configuration of the arrival direction detecting part 22 includes, as shown in FIG. 5A, a delay time calculating part 23*a* for obtaining a delay time based on a correlation function of two input signals arbitrarily selected from a plurality of input signals.

The delay time calculating part 23*a* calculates a correlation function R(τ) of first and second input signals f(t) and g(t) arbitrarily selected from a plurality of input signals by the following Formula (2).

$$R(\tau)=\Sigma f(t)f(t+\tau) \tag{2}$$

The delay time calculating part 23*a* considers τ that maximizes the calculated correlation function R(τ) as a delay time ΔT between the first input signal and the second input signal.

Figure 5B:
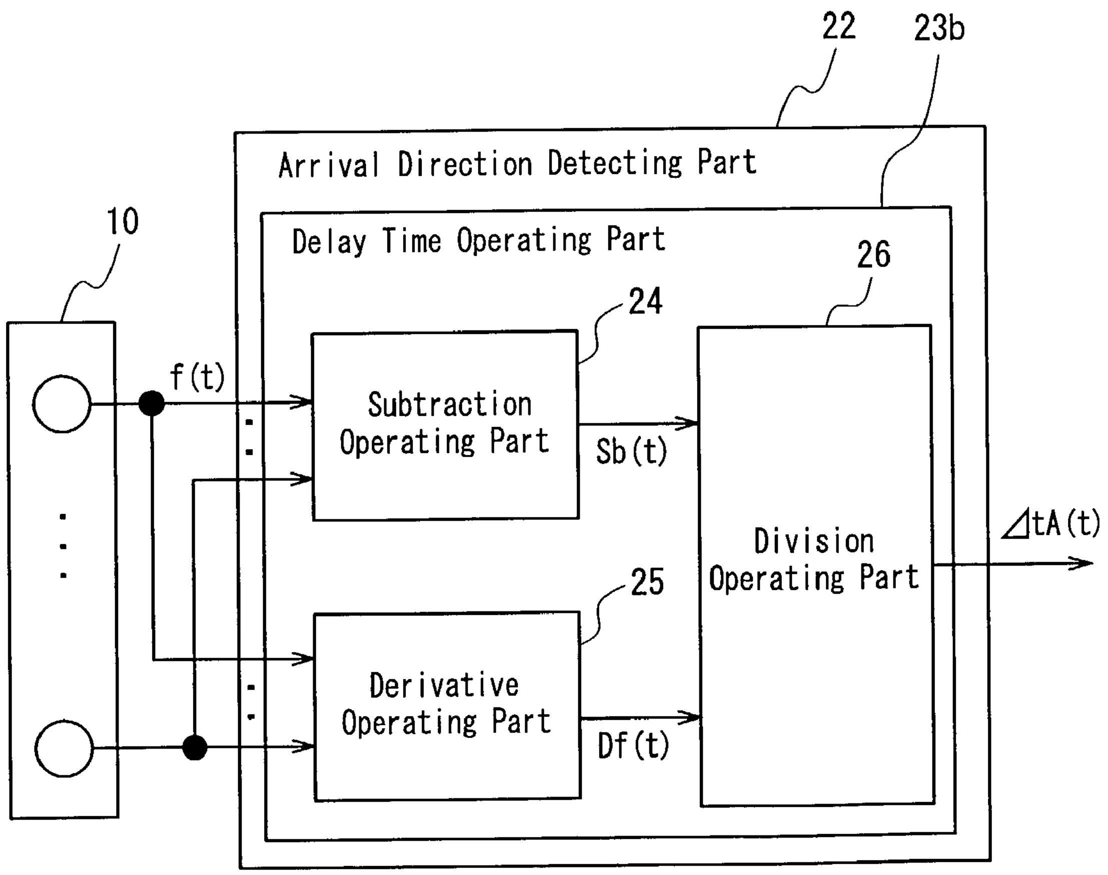

The second exemplary configuration of the arrival direction detecting part 22 includes, as shown in FIG. 5B, a delay time calculating part 23*b* for obtaining an approximated delay time based on a value obtained by dividing a subtraction value of two input signals arbitrarily selected from a plurality of input signals by the derivative of one of the two input signals.

First, the principle of obtaining an approximated delay time based on a value obtained by dividing a subtraction value of two input signals arbitrarily selected from a plurality of input signals by the derivative of one of the two input signals will be described.

Figure 6:
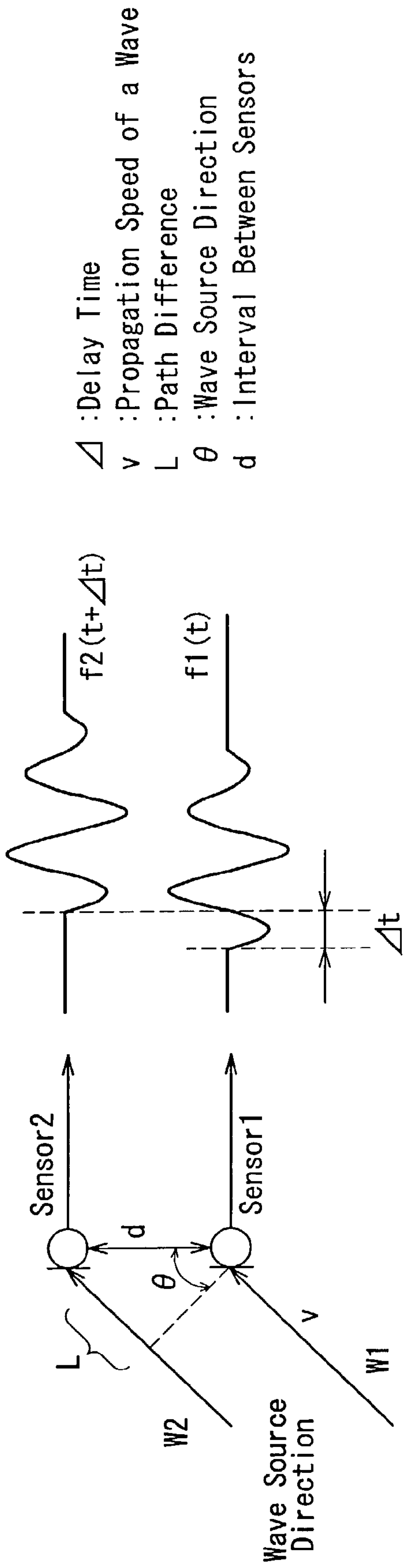
FIG. 6 illustrates a delay time between received signals in two sensors.

FIG. 6 illustrates a delay time between received signals at two sensors.

As shown in FIG. 6, it is assumed that sensors 1 and 2 are placed at a distance "d". It is also assumed that wave signals are transmitted from wave sources in a direction of an angle θ with respect to the sensors 1 and 2. The wave signals are assumed to be W1 and W2. The sensors 1 and 2 convert the respectively detected wave signals into electric signals to obtain two received signals. Herein, for convenience, two received signals are assumed to be a first received signal f1(t) and a second received signal f2(t).

Because of the relationship between the placement of the sensors 1 and 2 and the wave source direction, as shown in FIG. 6, there is a path difference "L" between a transmission path through which the wave signal W1 reaches the sensor 1 and a transmission path through which the wave signal W2 reaches the sensor 2. The path difference "L" causes a delay time Δt between the first received signal f1(t) and the second received signal f2(t). Herein, since both the waveforms are the same, the first received signal f1(t) and the second received signal f2(t) can be represented by f(t) and f(t+Δt) when time axes are aligned, as shown in FIG. 6.

When the second received signal f(t+Δt) is paid attention to, the second received signal f(t+Δt) can be subjected to Taylor series expansion as presented by Formula 3.

$$f(t+\Delta t) = f(t) + \Delta t \cdot f'(t) + \frac{(\Delta t)^2}{2!} \cdot f''(t) + \frac{(\Delta t)^3}{3!} f'''(t) + \cdots \quad (3)$$

If the speed of wave signals is sufficiently high, and the distance between the sensors 1 and 2 is sufficiently small, the delay time Δt takes a very small value. Therefore, even if Formula 3 is approximated as represented by Formula 4, ignoring the high order terms of Δt (i.e., the third and subsequent terms in Formula 3), the precision of a value in Formula 3 can be maintained high.

$$f(t+\Delta t) \approx f(t) + \Delta t \cdot f'(t) \quad (4)$$

Δt on the right side of Formula 4 represents an approximated delay time.

When Formula 4 is modified, Formula 5 is obtained.

$$\Delta t \approx \frac{f(t+\Delta t) - f(t)}{f'(t)} \quad (5)$$

In Formula 5, the approximated delay time is obtained by dividing f(t+Δt)−f(t) by f(t) (i.e., by dividing a difference signal between the first received signal and the second received signal by a derivative signal of the first received signal). That is, Formula 5 can be rewritten as Formula 6.

$$\Delta t = \frac{f_2(t) - f_1(t)}{f_1'(t)} \quad (6)$$

In the above operation, for convenience, the delay received signal (received signal with a delay of Δt) is set to be the second received signal. However, the delay received signal (received signal with a delay of Δt) may be set to be the first received signal. Furthermore, although the derivative signal is obtained by the derivative operation of the first received signal, it may be obtained by the derivative operation of the second received signal.

As described above, according to the delay time detection operation by Formula 6, the operation processing merely includes one subtraction operation between the first received signal and the second received signal, one derivative operation of the first received signal, and one division operation for dividing a subtraction operation result by a derivative operation result. Therefore, compared with the operation processing in the case of using a conventional correlation function, the amount of operation is small, which enables the processing to be conducted at a high speed.

The delay time calculating part calculates an approximated delay time by the above principle.

The delay time calculating part 23*b* includes, as shown in FIG. 5B, a difference signal operating part 24 for operating a difference signal between two input signals arbitrarily selected from a plurality of input signals, a derivative signal operating part 25 for operating a derivative signal of either input signal of arbitrarily selected two input signals, and a division signal operating part 26 for operating a division signal obtained by dividing a difference signal by a derivative signal, wherein the division signal is assumed to be a delay time between the arbitrarily selected two input signals. The arrival direction detecting part 22 detects the arrival direction of an input signals with respect to observation points of arbitrarily selected two input signals (which are the same as those used for calculating a delay time), based on the delay time detected by the delay time detecting part 23*b*. The difference signal operating part 24 obtains a subtraction operation between the first and second input signals f(t) and g(t) arbitrarily selected from a plurality of input signals by Formula 7.

$$f(t) - g(t) \quad (7)$$

The derivative signal operating part 25 calculates a derivative value of the first or second input signal. Herein, for example, the derivative value of the first input signal is obtained by Formula 8.

$$f'(t) \quad (8)$$

The division signal operating part 26 obtains a delay time Δτ by dividing the subtraction value obtained in the difference signal operating part 24 by the subtraction value obtained in the derivative signal operating part 25.

$$\Delta \tau = \frac{f(t) - g(t)}{f'(t)} \quad (9)$$

The arrival direction detecting part 22 calculates an arrival direction θ of input signals with respect to input points of arbitrarily selected two input signals (which are the same as those used for calculating a delay time), from the delay time Δτ detected by the delay time detecting part 23*b* and the distance "d" between two sensors targeted for calculation of a delay time. This principle will be described with reference to FIG. 6.

In FIG. 6, the distance "d" between sensors, the arrival direction θ of input signals, a path difference "L" between signal sources and two sensors, and the delay time Δτ have a relationship of Formula 10, assuming that a propagation speed of a signal is "v".

$$\Delta\tau = L/v = \frac{d\sin\theta}{v} \tag{10}$$

Thus, the arrival direction θ of input signals can be calculated by Formula (11).

$$\theta = \sin^{-1}\left(\frac{v\Delta\tau}{d}\right) \tag{11}$$

The second signal section candidate detecting part 20*b*' determines an intended signal section candidate, in the case where the absolute value of the difference between the arrival direction θ obtained in the arrival direction detecting part 22 and the previously set arrival direction $\theta_0$ of an intended signal is within Δθ, and determines a noise signal section candidate, in the case where the absolute value of the difference is larger than Δθ.

As described above, in the signal processing system of Embodiment 3, the signal section candidate detecting part 20 detects an intended signal section candidate and a noise signal section candidate by the algorithm for detecting an intended signal section candidate and a noise signal section candidate based on a change in a power of an input signal and the algorithm for detecting an intended signal section candidate and a noise signal section candidate based on an arrival direction of an input signal.

The intended signal section candidate and the noise signal section candidate detected by the signal section candidate detecting part 20 are classified by the same processing as that of Embodiment 1 or 2.

Embodiment 4

In a signal processing system of Embodiment 4, the signal section candidate detecting part uses a combination of an algorithm for detecting an intended signal section candidate and a noise signal section candidate based on a change in a power of an input signal and an algorithm for detecting arrival directions of input signal based on a power ratio of the input signals and detecting an intended signal section candidate and a noise signal section candidate based on the arrival directions.

Figure 7:
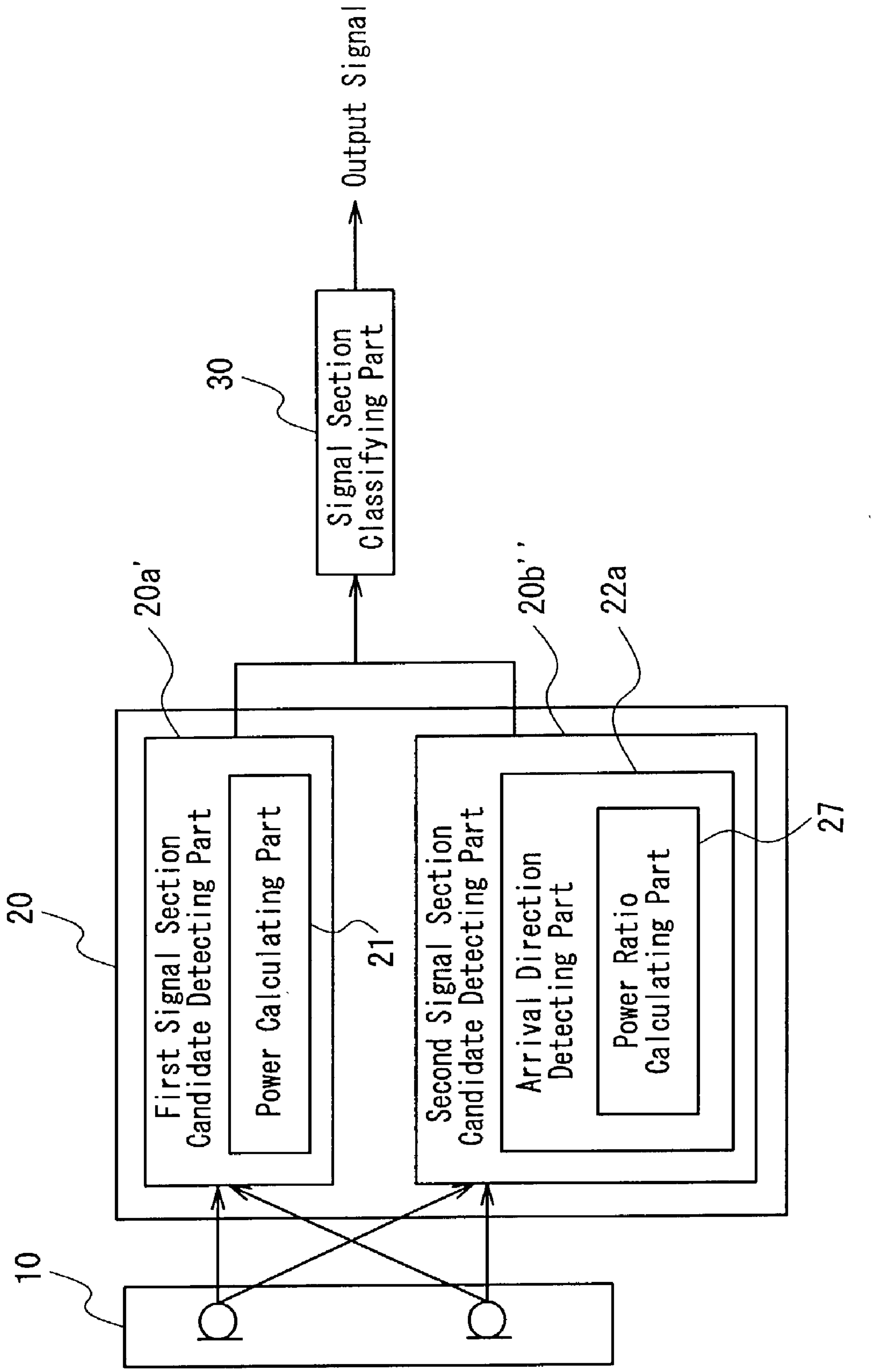
FIG. 7 shows a configuration of a signal processing system of Embodiment 4 according to the present invention.

FIG. 7 shows a configuration of the signal processing system of Embodiment 4. In FIG. 7, the input part 10 and the signal section classifying part 30 are the same as those in FIG. 1.

A second signal section candidate detecting part 20*b*" includes a power ratio calculating part 27, which detects arrival directions of input signals based on a power ratio of the input signals and detects an intended signal section candidate and a noise signal section candidate based on the arrival directions.

The power ratio calculating part 27 calculates a power ratio between first and second input signals. The arrival direction detecting part 22*a* calculates arrival directions of the input signals based on the power ratio obtained in the power ratio calculating part 27. More specifically, it is understood that in the case where the powers of both the signals are the same, the signals are transmitted in front directions with respect to two input sensors, and in the case where the power ratio is maximum, the signals are transmitted in side directions. Herein, the front directions refer to those of a line connecting two sensors, and the side directions refer to those of a line orthogonal to the line connecting two sensors. Thus, the arrival directions of the input signals can be detected by analyzing a power ratio.

A power ratio can be calculated with less amount of calculation, compared with calculation of a correlation function coefficient, which can decrease the load on a resource of the signal processing system.

The processing in the second signal section candidate detecting part 20*b*" is the same as that described in Embodiment 3, except for using an algorithm for detecting arrival directions of input signals based on a power ratio of input signals and detecting an intended signal section candidate and a noise signal section candidate based on the arrival directions. Therefore, the description thereof is omitted here.

Embodiment 5

A signal processing system of Embodiment 5 conducts noise signal suppression processing together with detection of an intended signal section and a noise signal section.

Figure 8:
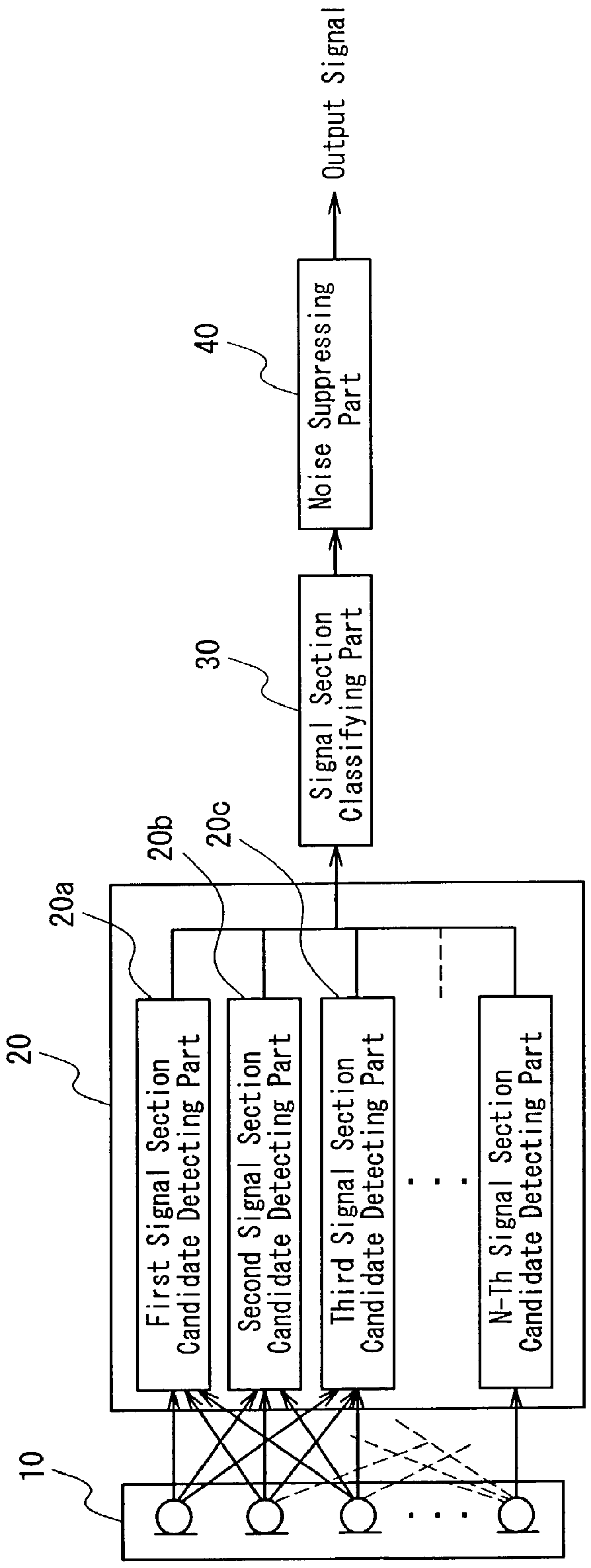
FIG. 8 shows a configuration of a signal processing system of Embodiment 5 according to the present invention.

FIG. 8 shows a configuration of the signal processing system of Embodiment 5.

The input part 10, the signal section candidate detecting part 20, and the signal section classifying part 30 may be the same as those of Embodiment 1 shown in FIG. 1. The detailed description thereof is omitted here. The signal section candidate detecting part 20 is not limited to that described in Embodiment 1. The first signal section candidate detecting part 20*a*' or the second signal section candidate detecting part 20*b*' of Embodiment 3 shown in FIG. 4, or the second signal section candidate detecting part 20*b*" of Embodiment 4 shown in FIG. 7 may be used.

The signal processing system of Embodiment 5 includes a noise suppressing part 40.

The noise suppressing part 40 receives at least one input signal from the input part 10, and suppresses the level of the input signal while varying a suppression amount in accordance with the property of each signal section classified by the signal section classifying part 30. For example, the noise suppressing part 40 lowers a signal level by assigning weights to a noise signal section.

Herein, as a weight coefficient, a linear coefficient, a non-linear coefficient, a binary coefficient, or the like can be used. Hereinafter, an example of a weight coefficient with respect to a stationary noise signal section and a non-stationary noise signal section described in Embodiment 2 will be shown.

Assuming that a weight coefficient with respect to a stationary noise signal section is Wa, a weight coefficient with respect to a non-stationary noise signal section is Wb, a weight coefficient with respect to an intended signal section is Wc, an average power of a stationary noise signal section is Ps, and an average power of a non-stationary noise signal section is Pns, each weight coefficient is set by Formula 12 in accordance with a signal power of each signal section.

$$\begin{cases} Wa = r \\ Wb = \dfrac{rP_s}{P_{ns}} \\ Wc = 1.0 \end{cases} \quad (12)$$

(where $r \leq 1$)

By multiplying an input signal f(t) by the weight coefficient in accordance with each signal section, a noise level in a stationary noise signal section and a non-stationary noise signal section can be suppressed similarly. Furthermore, the stationary noise signal can be removed, and the non-stationary noise signal can be reduced.

Embodiment 6

A signal processing system of Embodiment 6 conducts noise signal suppression processing together with detection of an intended signal section and a noise signal section, in the same way as in Embodiment 5.

The signal processing system of Embodiment 6 conducts noise signal suppression processing using a noise model.

In particular, the signal processing system of Embodiment 6 includes a noise model presuming part and a noise suppressing part. The noise model presuming part classifies a noise signal section candidate into a stationary noise signal section and a non-stationary noise signal section, and presumes a noise model in a signal section that has been classified as a stationary noise signal section without presuming a noise model in signal sections classified as an intended signal section and a non-stationary noise signal section. The noise suppressing part suppresses a noise based on the noise model presumed by the noise model presuming part.

Figure 9:
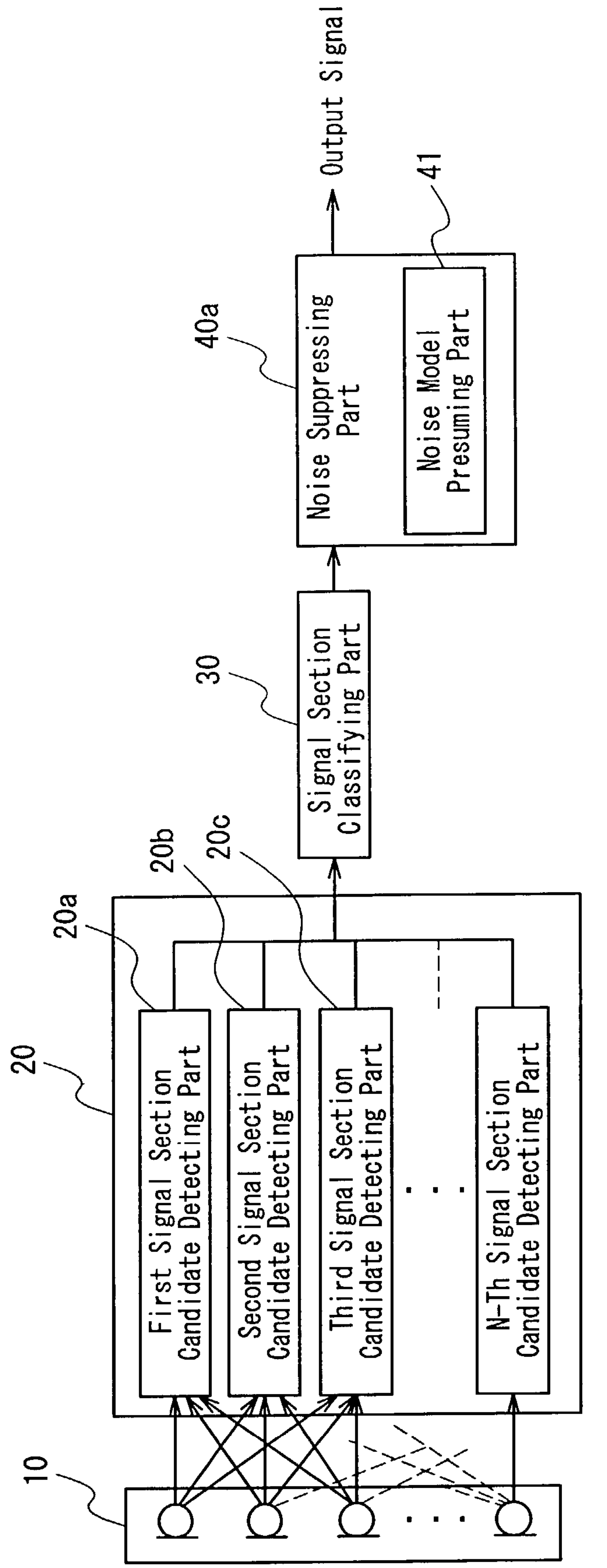
FIG. 9 shows a configuration of a signal processing system of Embodiment 6 according to the present invention.

FIG. 9 shows a configuration of the signal processing system of Embodiment 6.

The input part 10, the signal section candidate detecting part 20, and the signal section classifying part 30 may be the same as those of Embodiment 5 shown in FIG. 8, and the description thereof is omitted here.

A noise suppressing part 40*a* includes a noise model presuming part 41, and suppresses a noise based on a noise model presumed by the noise model presuming part 41.

Herein, the noise model presuming part 41 presumes a noise model in a signal section classified as a stationary noise signal section without presuming a noise model in signal sections classified as an intended signal section and a non-stationary noise signal section.

By conducting presumption processing in the noise model presuming part 41 only in a stationary noise signal section, noise suppression performance can be maintained high. The reason for this is as follows. In the signal processing system of Embodiment 6, a noise model is presumed only in a stationary noise signal section, so that a noise model is obtained only with respect to a stationary noise signal. If a noise model is presumed in a non-stationary noise signal section, an effective non-stationary noise signal component is included only in the non-stationary noise signal section. Consequently, a non-stationary noise signal component not corresponding to a stationary noise signal section and a non-stationary noise signal section is suppressed, which may degrade noise suppression performance.

Embodiment 7

A signal processing system of Embodiment 7 conducts noise signal suppression processing together with detection of an intended signal section and a noise signal section, in the same way as in Embodiment 5.

The signal processing system of Embodiment 7 applies noise suppression processing based on spectrum subtraction to a stationary noise signal section, and applies noise suppression processing to a non-stationary noise signal section in accordance with the property thereof.

Figure 10:
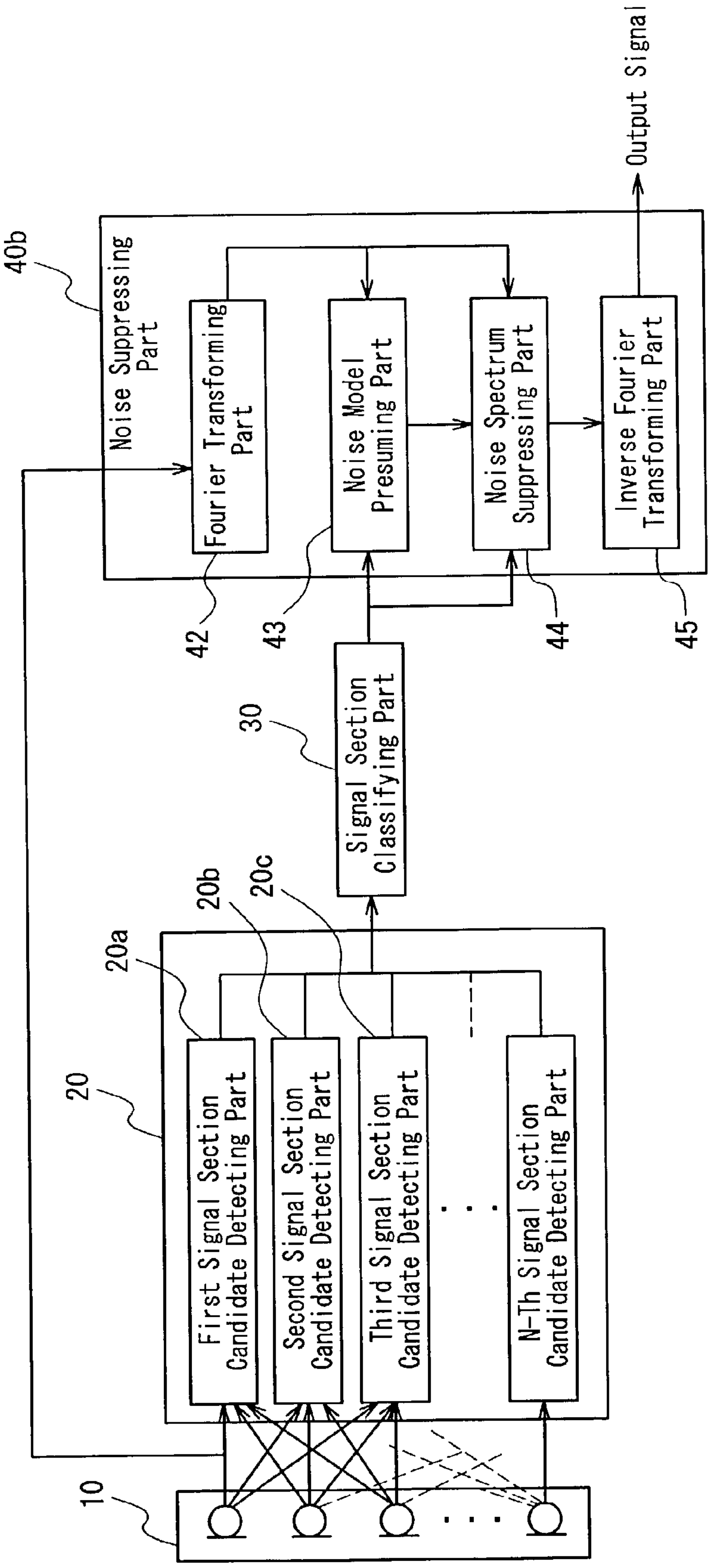
FIG. 10 shows a configuration of a signal processing system of Embodiment 7 according to the present invention.

FIG. 10 shows a configuration of the signal processing system of Embodiment 7.

The input part 10 , the signal section candidate detecting part 20 , the signal section classifying part 30 may be the same as those of Embodiment 5 shown in FIG. 8, and the description thereof is omitted here.

In FIG. 10, a noise suppressing part 40*b* includes a Fourier transforming part 42, a noise model presuming part 43, a noise spectrum suppressing part 44, and an inverse Fourier transforming part 45.

The Fourier transforming part 42 receives at least one input signal from the input part 10 . Then, the Fourier transforming part 42 conducts a window function with respect to the input signal, and thereafter, obtains an input spectrum signal by Fourier transformation.

The noise model presuming part 43 receives a signal in a signal section classified as a stationary noise signal section, calculates a spectrum thereof, and presumes a noise spectrum signal in the stationary noise signal section.

The noise spectrum suppressing part 44 receives the input spectrum signal from the Fourier transforming part 42, and also receives the noise spectrum signal from the noise model presuming part 43. Then, the noise spectrum suppressing part 44 subtracts the noise spectrum signal from the input spectrum signal, thereby removing the noise spectrum signal component.

The inverse Fourier transforming part 45 returns the spectrum signal on a frequency region to a signal on a time region by inverse Fourier transformation.

Because of the above configuration, the noise suppressing part 40*b* can apply noise suppression processing based on spectrum subtraction to a stationary noise signal section.

By applying a noise suppression system to a non-stationary noise signal section in accordance with the property thereof, a superimposed signal component of a non-stationary noise signal or a stationary noise signal and a non-stationary noise signal in a non-stationary noise signal section appropriately, so that noise suppression processing can be conducted effectively.

Embodiment 8

A signal processing system of Embodiment 8 conducts intended signal section detection processing, noise signal section detection processing, and noise signal suppression processing with respect to an input signal (voice signal), and conducts speech recognition processing with respect to an intended signal.

Figure 11:
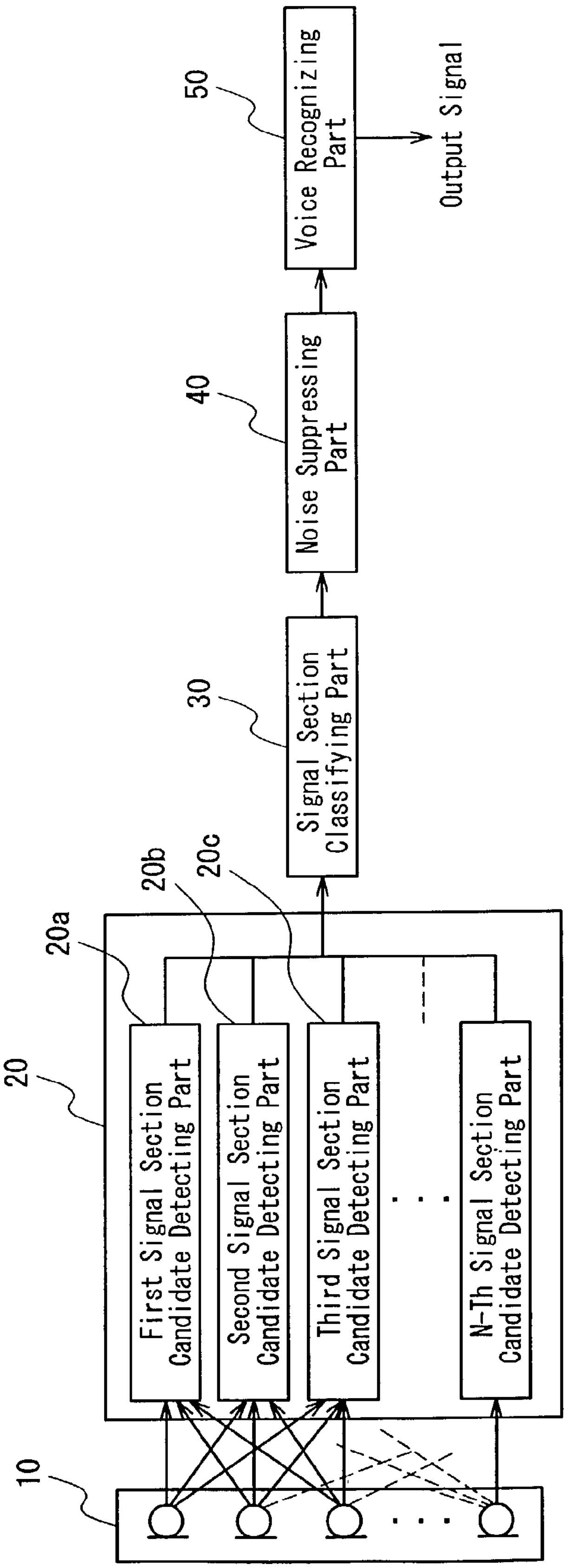
FIG. 11 shows a configuration of a signal processing system of Embodiment 8 according to the present invention.

FIG. 11 shows a configuration of the signal processing system of Embodiment 8.

The input part 10 , the signal section candidate detecting part 20 , the signal section classifying part 30, and the noise suppressing part 40 may be the same as those of Embodiment 5, and the detailed description thereof is omitted here.

The noise suppressing part 40 is not limited to that of Embodiment 5. The noise suppressing part 40*a* of Embodiment 6 or the noise suppressing part 40*b* of Embodiment 7 may be used.

The signal processing system of Embodiment 8 includes a speech recognizing part 50.

The speech recognizing part 50 receives an input signal after noise suppression processing from the noise suppressing part 40, and conducts speech recognition processing with respect to a signal in an intended signal section.

In the speech recognizing part 50, a speech recognition processing algorithm in the prior art may be used. For example, an intended signal is divided into phonemes, and a voice is recognized by pattern matching with a voice model on the phoneme basis.

As described above, the signal processing system of Embodiment 8 conducts the noise suppression processing of the present invention, as pre-processing, with respect to an input signal obtained in an input environment where a non-stationary noise is present, thereby enhancing a speech recognition precision.

Embodiment 9

Figure 12:
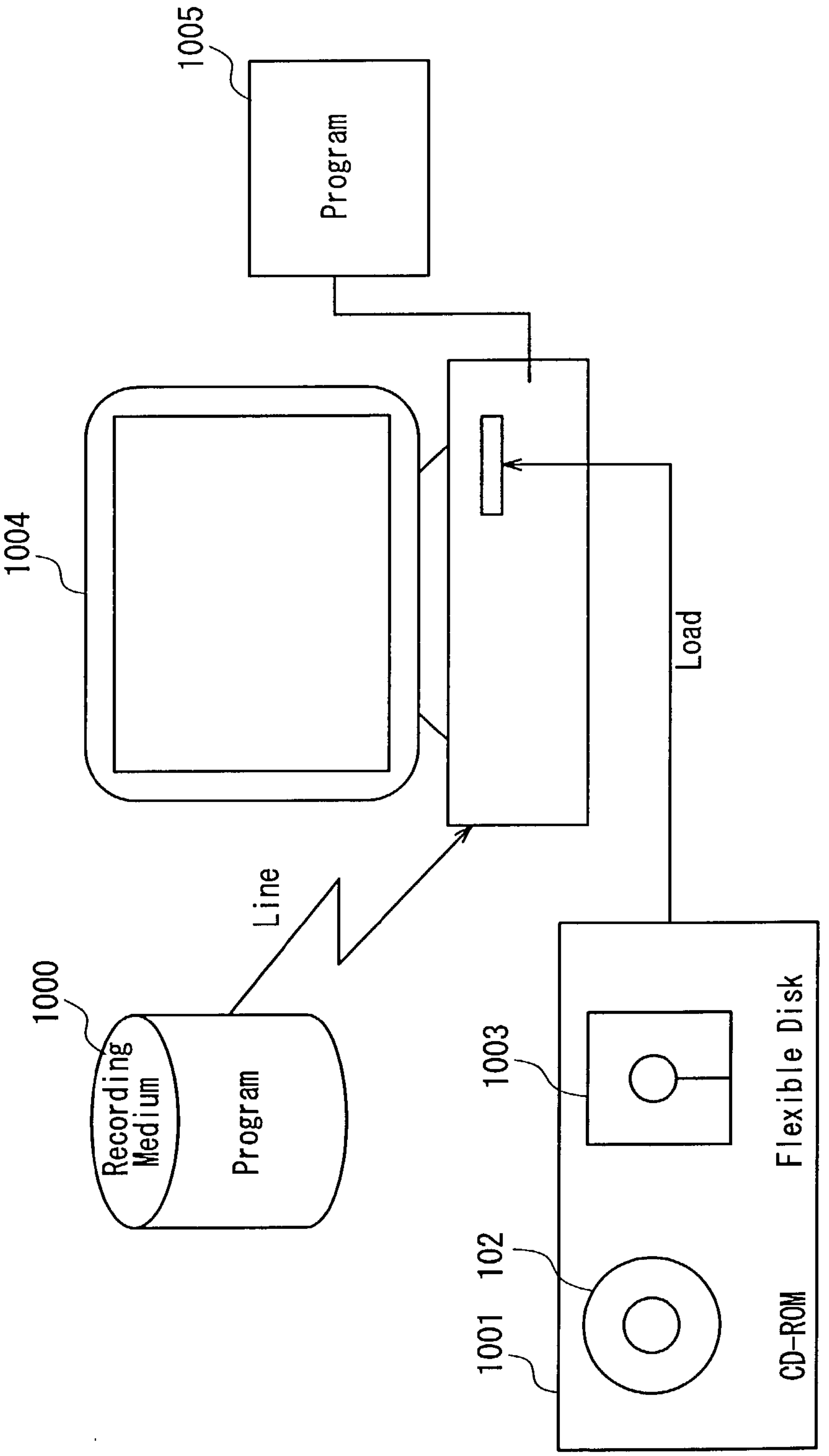
FIG. 12 shows exemplary recording media recording processes of realizing the signal processing system according to the present invention in Embodiment 9.
Figure 13:
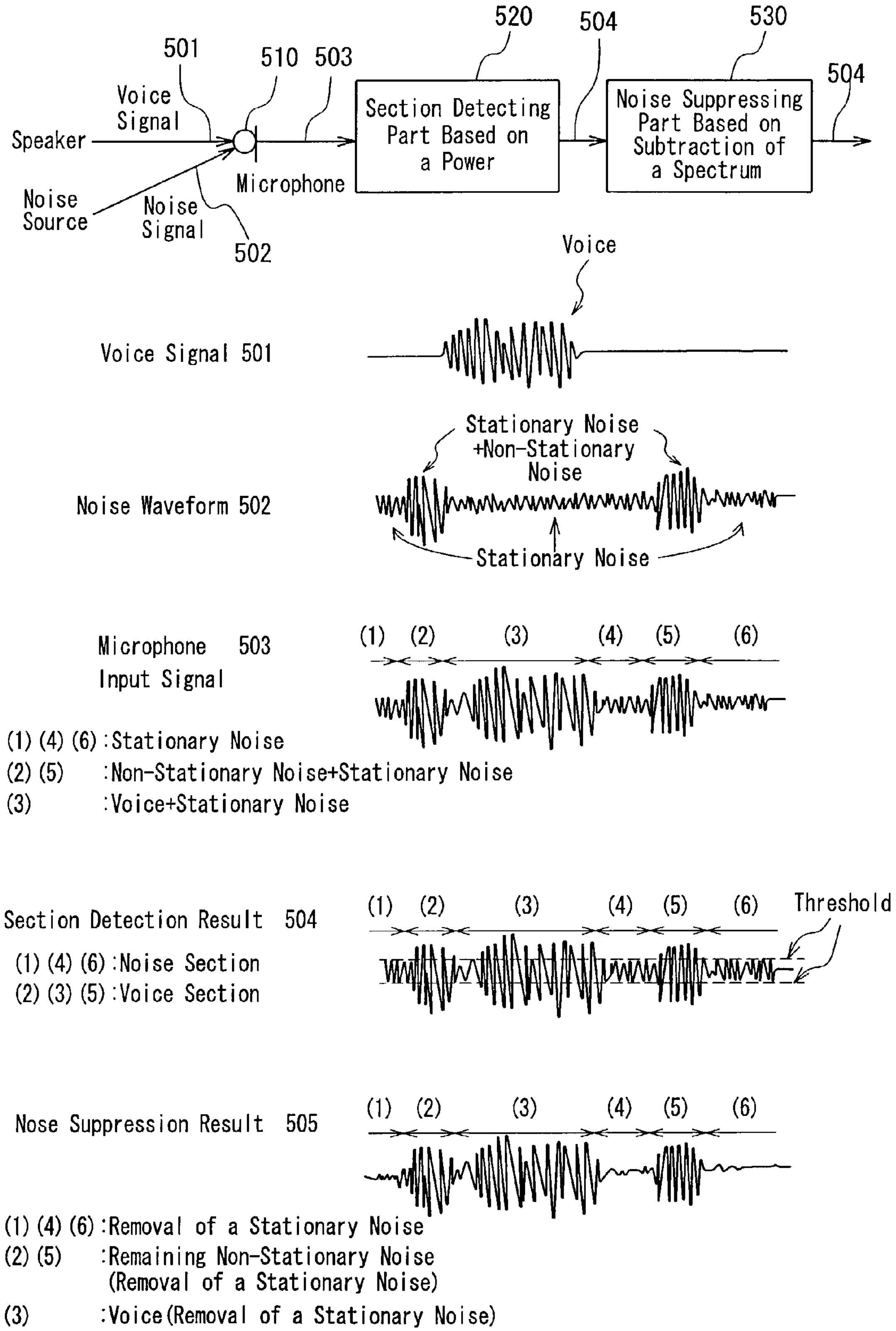
FIG. 13 illustrates a system for suppressing a noise by conventional processing of detecting a signal section based on a power of an input signal and conventional processing of suppressing a noise based on spectrum subtraction.
Figure 14:
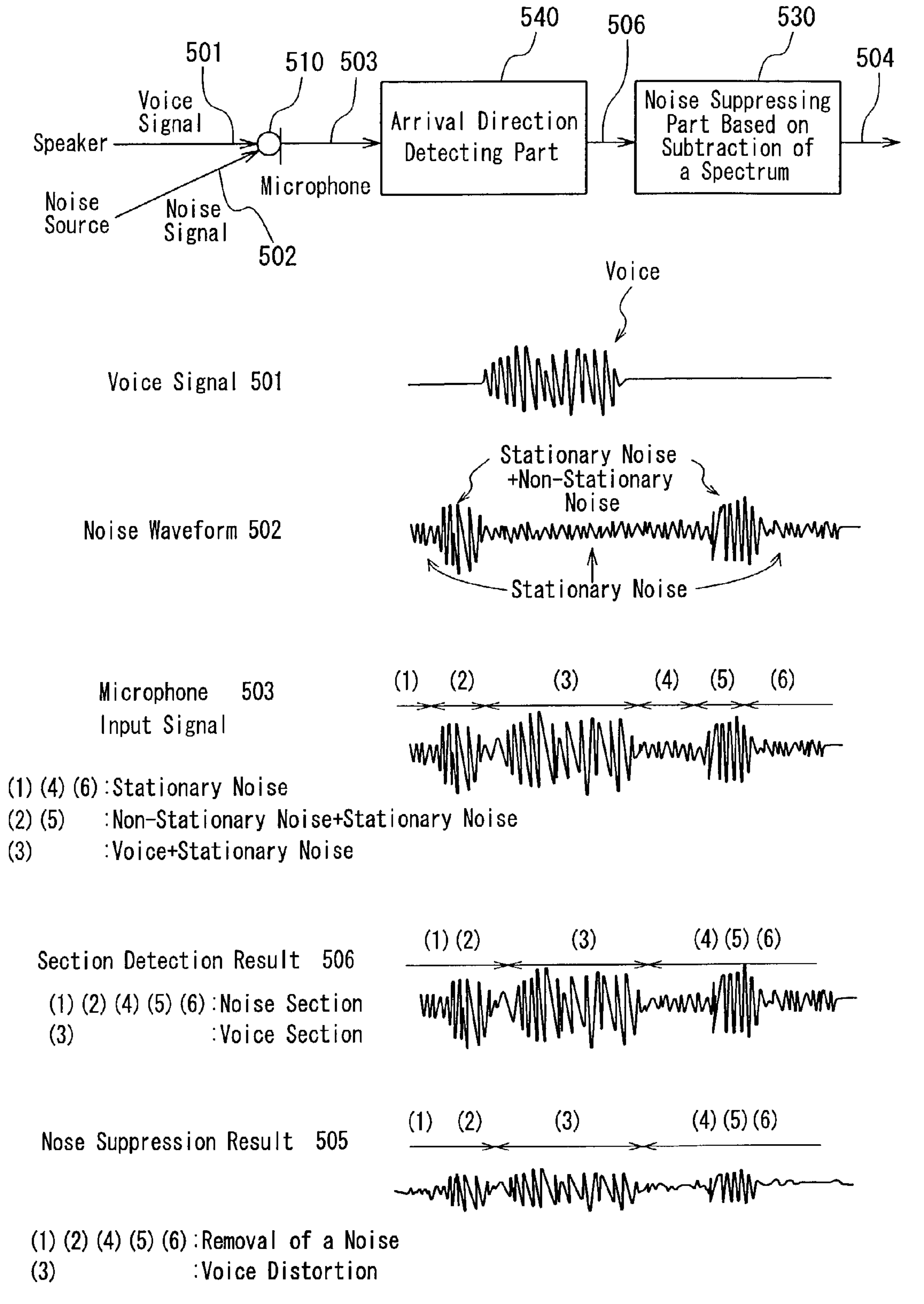
FIG. 14 illustrates a system for suppressing a noise by conventional processing of detecting a signal section based on an arrival direction of an input signal and conventional processing of suppressing a noise based on spectrum subtraction.

The wave signal processing of the present invention can be described as a program including processes of realizing the above-described processing, and by allowing a computer to read the program, the wave signal processing of the present invention can be conducted. The program including processes of realizing the signal processing system of the present invention can be stored in a recording medium 1000 in a recording apparatus on a network, and a recording medium 1005 such as a hard disk and a RAM of a computer, as well as a portable recording medium such as a CD-ROM 1002 and a flexible disk 1003, as shown in FIG. 12. In execution, the program is loaded onto the computer 1004, and executed on a main memory.

The intended signal section detection processing, the noise signal section detection processing, the noise suppression processing, and the speech recognition processing, described in Embodiments 1 to 8, may be appropriately combined.

The signal processing system of the present invention can not only classify an input signal into an intended signal section and a noise signal section, but also classify the noise signal section into noise signal sections having a plurality of different properties.

Furthermore, in the signal processing system of the present invention, a signal section candidate detected as a noise signal section candidate by all the algorithms is classified as a type-I noise signal section, and a signal section candidate detected as a noise signal section candidate by any of the algorithms is classified as a type-II noise signal section. Furthermore, the type-I noise signal section can be classified as a stationary noise signal section in which only a stationary noise appears, the type-II noise signal section can be classified as non-stationary noise signal section in which a stationary noise superimposed with a non-stationary noise appears, and a noise signal section can be appropriately classified into a stationary noise signal section and a non-stationary noise signal section.

The signal processing system of the present invention enables noise suppression processing to be conducted with respect to the noise signal sections classified as described above. Furthermore, noise suppression processing can be conducted so as to be appropriate for the stationary noise signal section and the non-stationary noise signal section, respectively.

The signal processing system of the present invention enables speech recognition processing and the like to be conducted with respect to a classified intended signal section. If speech recognition is conducted with respect to a signal after the noise suppression processing, high recognition precision can be obtained.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A signal processing system comprising:

an input part for inputting an input signal;

a plurality of signal section candidate detecting parts for detecting an intended signal section candidate that is a candidate in a signal section in which an intended signal to be detected is recorded and a noise signal section candidate other than the intended signal section candidate from the input signal, the respective signal section candidate detecting parts using different detection algorithms for an intended signal section candidate and a noise signal section candidate; and a signal section classifying part for being notified of detection results of the respective signal section candidates from the plurality of signal section candidate detecting parts and classifying the signal section candidates based on a combination of the detection results, wherein the signal section classifying part classifies a signal section candidate, which is detected as an intended signal section candidate by all the plurality of signal section candidate detecting parts, as an intended signal section, classifies a signal section candidate, which is detected as a noise signal section candidate by all the plurality of signal section candidate detecting parts, as a type-I noise signal section, and classifies a signal section candidate, which is detected as an intended signal section candidate by any of the plurality of signal section candidate detecting parts and detected as a noise signal section candidate by any of the plurality of signal section candidate detecting parts, as a type-II noise signal section.

2. A signal processing system according to claim 1, wherein the signal section classifying part classifies the type-I noise signal section as a stationary noise signal section in which only a stationary noise appears, and the type-II noise signal section as a non-stationary noise signal section in which a stationary noise superimposed with a non-stationary noise appears.

3. A signal processing system according to claim 1, wherein at least one of the plurality of signal section candidate detecting parts uses an algorithm for detecting the intended signal section candidate and the noise signal section candidate based on a change in a power of the input signal, and at least one of the plurality of signal section candidate detecting parts uses an algorithm for detecting an arrival direction of the input signal and detecting the intended signal section candidate and the noise signal section candidate based on the arrival direction.

4. A signal processing system according to claim 1, further comprising:

a noise suppressing part for applying the same noise suppression processing to the intended signal section candidate and the noise signal section candidate or selecting noise suppression processing in accordance with a classification result of the signal section classifying part and applying the selected noise suppression processing to the intended signal section candidate and the noise signal section candidate.

5. A signal processing system according to claim 2, comprising a noise suppressing part that does not conduct noise suppression processing with respect to a signal in the intended signal section and conducts noise suppression processing of assigning a weight smaller than 1 with respect to a signal in the stationary noise signal section and a signal in the non-stationary noise signal section.

6. A signal processing system according to claim 4, comprising a noise model presuming part for presuming a stationary noise model only in a signal section classified as the stationary noise signal section and stops presuming a noise model in signal sections classified as the intended signal section and the non-stationary noise signal section, wherein the noise suppressing part suppresses a noise based on the noise model presumed by the noise model presuming part.

7. A signal processing system according to claim 5, comprising a noise model presuming part for presuming a stationary noise model only in a signal section classified as the stationary noise signal section and stops presuming a noise model in signal sections classified as the intended signal section and the non-stationary noise signal section, wherein the noise suppressing part conducts noise suppression processing based on the noise model presumed by the noise model presuming part.

8. A signal processing system according to claim 4, comprising a noise model presuming part for presuming a stationary noise model only in a signal section classified as the stationary noise signal section and stops presuming a noise model in signal sections classified as the intended signal section and the non-stationary noise signal section, wherein the noise suppressing part conducts noise suppression processing based on the noise model presumed by the noise model presuming part and suppresses a signal level in the non-stationary noise signal section after the noise suppression processing to an average signal level in the stationary noise signal section after the noise suppression processing.

9. A signal processing system according to claim 5, comprising a noise model presuming part for presuming a stationary noise model only in a signal section classified as the stationary noise signal section and stops presuming a noise model in signal sections classified as the intended signal section and the non-stationary noise signal section, wherein the noise suppressing part conducts noise suppression processing based on the noise model presumed by the noise model presuming part and suppresses a signal level in the non-stationary noise signal section after the noise suppression processing to an average signal level in the stationary noise signal section after the noise suppression processing.

10. A signal processing system according to claim 3, wherein a plurality of input signals obtained from at least two observation points are input to the input part, and a signal section candidate detecting part using an algorithm for detecting the intended signal section candidate and the noise signal section candidate based on the arrival direction includes: a delay time detecting part for obtaining a delay time based on a correlation function of two input signals arbitrarily selected from the plurality of input signals; and a direction detecting part for detecting the arrival direction of the input signal with respect to input points of the two arbitrarily selected input signals, based on the delay time detected by the delay time detecting part.

11. A signal processing system according to claim 3, wherein a plurality of input signals obtained from at least two observation points are input to the input part, and a signal section candidate detecting part using an algorithm for detecting the intended signal section candidate and the noise signal section candidate based on the arrival direction, includes: a subtraction operating part for calculating a subtraction between two input signals arbitrarily selected from the plurality of input signals; a derivative signal operating part for calculating a derivative signal of either input signal of the two arbitrarily selected input signals; a division signal operating part for calculating a division signal obtained by dividing the subtraction by the derivative signal; a delay time detecting part for detecting the division signal as a delay time between the two arbitrarily selected input signals; and a direction detecting part for detecting the arrival direction of the input signal with respect to the two observation points of the two arbitrarily selected input signals based on the delay time detected by the delay time detecting part.

12. A signal processing system according to claim 1, wherein the input signal is a voice signal, and the signal processing system comprises a speech recognizing part for recognizing a voice with respect to a voice signal in the intended signal section.

13. A signal processing system according to claim 4, wherein the input signal is a voice signal, and the signal processing system comprises a speech recognizing part for recognizing a voice with respect to a voice signal in the intended signal section.

14. A signal processing system according to claim 4, wherein the input signal is a voice signal, and the signal processing system comprises a speech recognizing part for recognizing a voice with respect to a voice signal in the intended signal section.

15. A method for processing a signal comprising:

inputting an input signal;

conducting a plurality of signal section candidate detection processes of detecting an intended signal section candidate that is a candidate in a signal section in which an intended signal to be detected is recorded and a noise signal section candidate other than the intended signal section candidate from the input signal, the respective signal section candidate detection processes using different detection algorithms for an intended signal section candidate and a noise signal section candidate; and being notified of detection results of the respective signal section candidates from the plurality of signal section candidate detecting processes and classifying the signal section candidates based on a combination of the detection results, wherein a signal section candidate, which is detected as an intended signal section candidate by all the plurality of signal section candidate detecting processes, is classified as an intended signal section, a signal section candidate, which is detected as a noise signal section candidate by all the plurality of signal section candidate detecting processes, is classified as a type-I noise signal section, and a signal section candidate, which is detected as an intended signal section candidate by any of the plurality of signal section candidate detecting processes and detected as a noise signal section candidate by any of the plurality of signal section candidate detecting processes, is classified as a type-II noise signal section.

16. A computer-readable recording medium storing a program that is executable by a computer for conducting signal section detection processing, the program comprising:

inputting an input signal;

conducting a plurality of signal section candidate detection processes of detecting an intended signal section candidate that is a candidate in a signal section in which an intended signal to be detected is recorded and a noise signal section candidate other than the intended signal section candidate from the input signal, the respective signal section candidate detection processes using different detection algorithms for an intended signal section candidate and a noise signal section candidate; and being notified of detection results of the respective signal section candidates from the plurality of signal section candidate detecting processes and classifying the signal section candidates based on a combination of the detection results wherein a signal section candidate, which is detected as an intended signal section candidate by all the plurality of signal section candidate detecting processes, is classified as an intended signal section, a signal section candidate, which is detected as a noise signal section candidate by all the plurality of signal section candidate detecting processes, is classified as a type-I noise signal section, and a signal section candidate, which is detected as an intended signal section candidate by any of the plurality of signal section candidate detecting processes and detected as a noise signal section candidate by any of the plurality of signal section candidate detecting processes, is classified as a type-II noise signal section.

* * * * *